Figure 4:
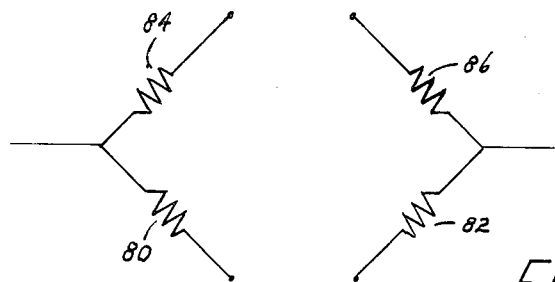

Oct. 31, 1961 YAO T. LI 3,006,192
PRESSURE GAUGE
Filed March 12, 1957 2 Sheets-Sheet 1

INVENTOR.
Yao Tzu Li

Oct. 31, 1961    YAO T. LI    3,006,192
PRESSURE GAUGE

Filed March 12, 1957    2 Sheets-Sheet 2

INVENTOR.
Yao Tzu Li

United States Patent Office 3,006,192
Patented Oct. 31, 1961

3,006,192
PRESSURE GAUGE
Yao T. Li, 28 Orchard St., Watertown, Mass.
Filed Mar. 12, 1957, Ser. No. 645,594
6 Claims. (Cl. 73—406)

This invention relates to pressure gauges and more particularly comprises a new and improved cooling system for the casings of pressure gauges used to measure pressures in the combustion chambers of rocket motors.

The temperatures of gases within the combustion chambers of rocket motors are extremely high and vary over wide ranges. These conditions make it essential to provide a heat barrier about the pressure sensing elements in pressure gauges used to measure the pressures in the combustion chambers. Not only it is essential to keep the sensing elements relatively cool so as to prevent the sensing elements from quickly burning out, but furthermore it is essential to prevent the changing temperatures from disrupting the uniform response of the sensing elements to the pressure. Moreover, it is extremely desirable to isolate physically the inner portion of the pressure gauge casing bearing the pressure sensing element from the portion of the casing in contact with the walls of the combustion chamber so that expansion and contraction of that portion of the casing wall is not transmitted to the pressure sensing element.

One important object of my invention is to prevent expansion of the outer portion of the pressure gauge casing from effecting the operation of the pressure sensing element.

Another important object of my invention is to provide a cooling system for the casing, which is independent from any system employed to cool the pressure sensing element itself.

To accomplish these and other objects of my invention, my pressure gauge includes among its important features a cylindrical casing which houses the pressure sensing elements and a signaling device. Independent of the cooling system incorporated into the gauge for cooling the sensing element I provide a recess which extends around the casing at the end which is exposed to the interior of the combustion chamber. An annular diaphragm covers the recess and forms a closed passage about the lower portion of the casing. Inlet and outlet passages extend downwardly through the casing to direct a cooling medium through the passage defined by the recess and the annular diaphragm.

The annular passage about the end of the casing adjacent to the interior of the combustion chamber isolates the pressure sensing elements from the walls of the chamber and expansion and contraction of the outer portions of the casing walls due to heat transferred to it from the walls of the chamber do not effect the sensing element.

Figure 1:
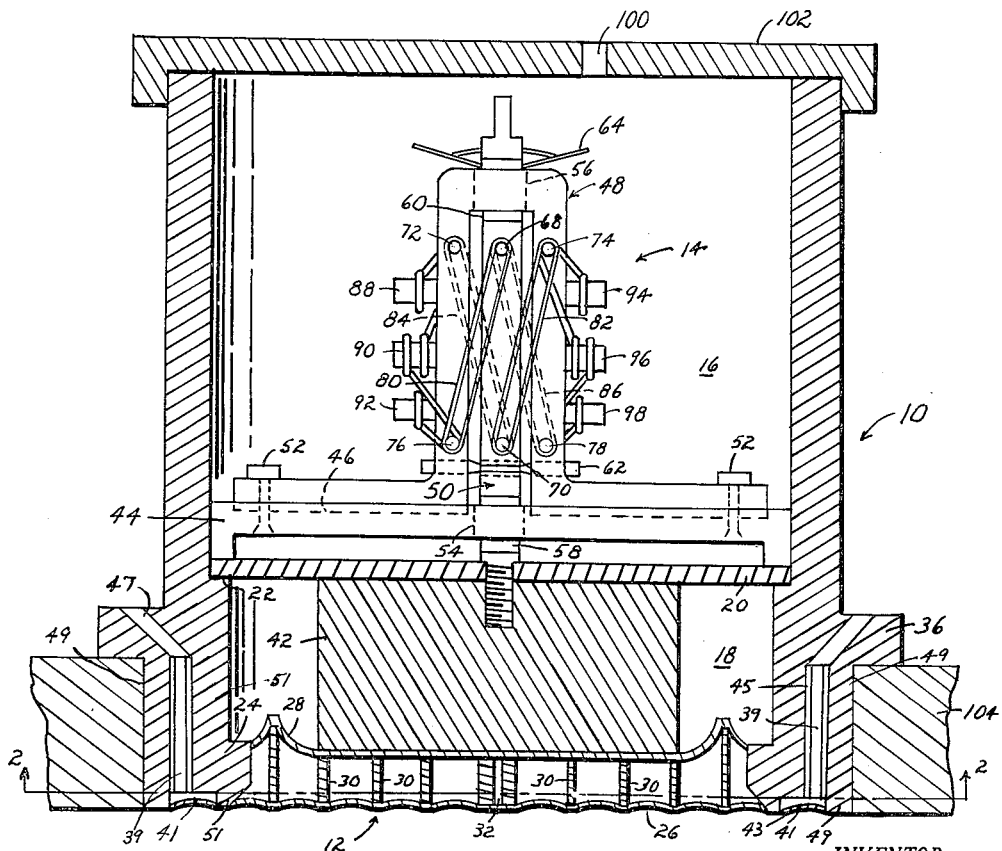
Figure 3:
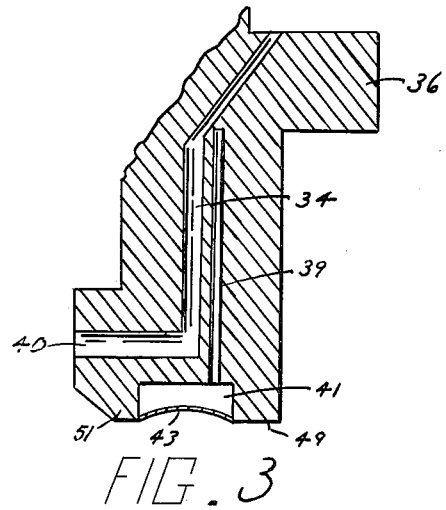
Figure 2:
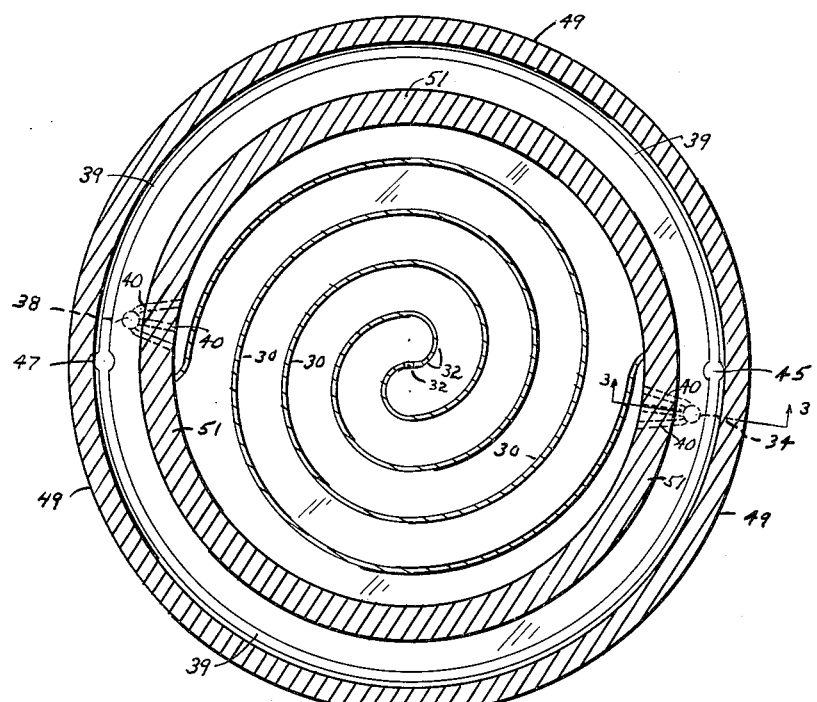

These and other objects and features of my invention along with its incident advantages will be better understood and appreciated from the following detailed description of one embodiment thereof, selected for purposes of illustration and shown in the accompanying drawing in which:

FIGURE 1 is a front view partially in section of a pressure gauge constructed in accordance with my invention, FIGURE 2 is a cross-sectional view taken along the corresponding section line in FIGURE 1, FIGURE 3 is a fragmentary view in section of a portion of the pressure gauge and taken along the section line 3—3 in FIGURE 2, FIGURE 4 is a schematic diagram of the signaling device shown in FIGURE 1.

The embodiment of my invention shown in the drawing includes in its general organization a casing 10 within which are positioned a pressure sensing device 12 and a signaling device 14. The cylindrical casing 10 is generally divided into an upper and lower chamber 16 and 18, respectively, by a rather rigid diaphragm 20 seated on a shoulder 22 formed on the inner surface of the cylinder 10. A flange 24 extending inwardly about the lower end of the cylindrical casing serves as a support for the pressure sensing device 12. The pressure sensing device 12 and the signaling device 14 are identical to those shown in my co-pending application filed on even date herewith.

The pressure sensing device 12 includes an outer spiral diaphragm 26 and an inner spiral diaphragm 28. The outer diaphragm 26 has its periphery connected to the lower surface of the flange 24 while the inner diaphragm 28 has its periphery secured to the upper surface of that flange. Between the two diaphragms is a double spiral ribbon 30 which is best shown in FIGURE 2. It will be noted that the ribbon 30 has its outer ends connected to the inner surface of the flange 24 at approximately 180° apart. With reference to FIGURE 2 it will be noted that the ribbon 30 defines a spiral passage which winds inwardly from the right side in a clockwise direction until it reaches the approximate center of the diaphragms where it turns in a counter-clockwise direction and winds outwardly until the passage reaches the left side of the cylindrical wall. A number of openings 32 are formed at the center of the ribbon to interconnect the clockwise and counter-clockwise portions of the passage. An inlet passage 34 (see FIGURES 2 and 3) extends downwardly through a flange 36 formed on the outer surface of the cylindrical casing 10 and through the lower portion of the casing, and turns inwardly through the flange 24 to direct a cooling medium such as water into the spiral passage between the diaphragms. A similar passage 38 is formed in the casing 10 and serves to discharge the cooling medium which has passed through the space between the diaphragms. To insure easy flow of the water in and out of the spiral passage from the inlet and outlet passages 34 and 38, a number of small openings 40 are formed in the flange 24.

From the foregoing description it will be appreciated that by virtue of the single passage defined by the spiral ribbon and the facing surfaces of the diaphragms, any obstruction which forms in that passage will restrict or completely stop the flow of the cooling medium between the diaphragms. Such an occurrence can be immediately detected by the reduced flow of the cooling medium out of the outlet passage 38, unlike other gauges which have a plurality of separate passages through the pressure sensing device. In those gauges, a restriction in one of the passages can not readily be detected because the flow of the cooling medium continues through the other unobstructed passages. The unobstructed passages will take up the added flow of the cooling medium and there will be no indication to the operator that the cooling system is working improperly until actual failure of the instrument occurs.

In operation, pressure applied to the outer surface of spiral diaphragm 26 causes it to move upwardly in the casing 10. The ribbon 30 which is made of a rigid material such as metal serves as a force transmitting member and causes the inner diaphragm 28 to move in tandem with the outer diaphragm. This motion of the diaphragms in response to pressure is transmitted through a block 42 to the signaling device 14. The stiff high pressure diaphragm 20 which extends across the casing 10 limits the movement of the spiral diaphragms to a very small distance.

In addition to the cooling system defined by the ribbon 30 and the facing surfaces of the spiral diaphragms 26 and 28 to carry a stream of water between the diaphragms to cool the sensing device 12, I provide a second system which isolates the inner lower portion of the casing 10 from the outer portion of the casing and thereby eliminates direct contact of the inner portion of the casing with the walls of the combustion chamber. It will be noted in FIGURES 1 and 2 that a recess 41 is formed in the bottom surface of the casing 10 and extends around its entire circumference. In addition, there is an annular space 39 communicating directly with the annular space 41. An annular diaphragm 43 secured to the lower surface of the casing 10 by any convenient means extends over the recess 41 and forms with it a closed annular passage. Inlet and outlet passages 45 and 47 similar to the passages 34 and 38 extend downwardly from the flange 36 and through the annular space and terminate in the annular recess 41. The inlet and outlet passages 45 and 47 are displaced circumferentially from the passages 34 and 38 and are completely independent from them. The passages 45 and 47 serve to direct a cooling medium such as water through the annular passage defined by the annular recess and space 41 and 39. This cooling medium serves as a heat barrier between the outer portion of the casing wall 49 which engages the wall of the combustion chamber and the inner portion 51 of the casing wall 10 which supports the diaphragm 26 and 28. The annular passage and space 41 and 39 serve still another purpose. Not only do they form a heat barrier to retard the flow of heat from the wall of the combustion chamber to the sensing device, but in addition they prevent any expansion or contraction of the outer casing wall 49 caused by the transfer of heat from the wall of the combustion chamber to it from being transmitted to the diaphragm 26 of the pressure sensing device 12. The flexible diaphragm 43 will not serve as a force transmitting member between the outer lower portion 49 of the casing 10 and the inner lower portion 51 of the casing because it does not provide any essential elastic restraining force against relative deflections of the inner and outer portions of the casing.

From the foregoing description it is apparent that my invention includes two completely separate cooling systems for the pressure gauge. Independent passages are provided to direct the cooling medium through each of the systems and therefore an operator can detect impaired operation of either of the systems by inspecting the flow of the cooling medium through each.

Having described the pressure sensing device and the means employed to protect it, I will now describe the signaling device 14. The signaling device 14 is supported on a disc 44 which in turn retains the stiff diaphragm 20 on the shoulder 22. The disc 44 has a pair of aligned recesses 46 in its upper surface which receive the base of the signaling device 14. It is to be understood that the signaling device illustrated is intended merely to be exemplary of a whole class of devices which may be used in connection with the pressure sensing element of my invention and the particular details of the signaling device disclosed form no part of this invention. The signaling device illustrated is disclosed fully in a co-pending application of which I am co-inventor with Shih-Ying Lee, filed December 17, 1956, Serial No. 628,624. The signaling device 14 is an unbonded strain gauge and includes a U-shaped yoke 48 and an armature 50. The yoke 48 which may be integrally formed with the base disposed within the recesses 46 is held stationary within the casing 10 by means of the rivets 52 which extend through the base and the disc 44. An opening 54 is formed in the center of the disc 44 and a second opening 56 aligned with the opening 54 is formed in the top of the yoke 48 and receive the bosses 58 and 60 formed at the bottom and top of the armature, respectively. The bosses 58 and 60 are of such diameters that neither is in actual contact with the sidewalls of the openings 54 and 56. A centering pin 62 is received in the opposite arms of the yoke and has a reduced central portion loosely received in an opening of the armature to permit a limited amount of relative movement of the armature with respect to the yoke. A spring clip 64 connected to the top of the yoke 48 and the upper portion of the armature 50 restrains motion of the armature other than in a longitudinal direction with respect to the yoke.

A pair of strain wire supporting pins 68 and 70 pass through the armature 50 and are suitably coated with an insulated lacquer covering. Similar pins 72 and 74 pass through the upper portions of the arms of the yoke 48 and an additional set of pins 76 and 78 pass through the lower portions of the arms of the yoke and form the entire support for the windings. As shown in FIGURE 1, four sets of windings are carried on the pins and are indicated at 80, 82, 84 and 86. Windings 80 and 82 are disposed on the front of the device as viewed in FIGURE 1 while the other windings are carried on the rear surface. Each winding is wound between one of the fixed pins on the yoke and one of the pins on the movable armature and are inclined slightly from the vertical as shown in FIGURE 1. Thus the winding 80 is wound in several turns about the pins 68 and 76 and the winding 82 is wound in several turns about the pins 74 and 70 and as shown in FIGURE 4 comprise adjacent legs of the bridge circuit. Winding 84 is wound in several turns about the pins 70 and 72 while winding 86 is wound in several turns about the pins 68 and 78 and comprise the other adjacent legs of the circuit.

For convenience a number of terminal posts 88, 90, 92, 94, 96 and 98 are carried on the sides of the yoke to facilitate the making of external connection to the strain wires. It will be noted that one end of winding 80 and one end of winding 84 are connected to the terminal post 90 and similarly one end of winding 82 and one end of winding 86 are connected to the terminal post 96, each forming the opposite connections in the bridge circuit.

It will be understood that the wires are wound under some initial tension as is customary in the unbonded strain gauge art. In operation, upward movement of the armature 50 causes the windings 80 and 86 to stretch, and thus the resistance in the opposite legs of the bridge circuit is increased while the windings 82 and 84 under similar movement of the armature decrease in length and reduce in resistance. Because of the manner in which the wires are wound in the gauge, a large electrical signal is produced by even a small movement of the armature.

Having described in detail each of the components of the pressure gauge, I will now describe the operation of the unit. To measure the pressure in a combustion chamber, the indicator is inserted into an opening formed in the combustion chamber wall 104 and the outer diaphragm 26 is exposed directly to the internal pressure in the chamber. If this pressure is greater than the ambient pressure exerted against the inner diaphragm 28, the assembly moves upwardly in the casing 10, the forces being exerted against the outer diaphragm 26 being transmitted through the ribbon 30 to the inner diaphragm 28, the block 42 and the armature 50 of the signaling device 14. It will be noted at this time that the outermost turn of the ribbon from each side of the flange 24 is of a greater height than the other portions of the ribbon so that no separation will occur between the upper surface of the outer turn of the ribbon and the inner diaphragm 28. Thus, the cooling medium passing through the inlet passage 34, the openings 40, the spiral passage between the diaphragms and the outlet passage 38 will not be permitted to bypass any portion of the spiral passage. As a result, effective cooling of the entire facing surfaces of the diaphragms is accomplished. The upward movement of the armature 50 causes the wires of the bridge circuit wound between the pins on the yoke and the armature to change in resistance and as is understood to those skilled in the art, a signal is produced which is a function of the pressure exerted on the outer diaphragm 26.

The effective cooling of the diaphragms will prevent any heat damage to the pressure sensing element in the gauge. The operator will readily be able to detect any interruption in the flow of the cooling medium through the spiral passage and should the operation of the cooling system be impaired, he may immediately stop the operation to prevent the instrument from burning out. The direct effect of the pressure exerted on the outer diaphragm 26 upon the windings of the strain gauge may be recorded on a meter disposed at some remote location from the gauge. The connections between the meter and the ends of the windings may be made by passing the leads through the opening 100 formed on the cover member 102 of the casing 10.

In addition to the flow of a cooling medium in and out of the spiral passage defined by the ribbon 30 and the diaphragms 26 and 28, a separate flow of the cooling medium will take place in and out of the passages 45 and 47 and through the annular passage defined by the annular spaces 39 and 41. As described fully in the detailed description, this cooling medium prevents the transfer of any expansion at the outer lower portion 49 of the casing to the inner portion 51 of the casing which supports the diaphragm. Thus, heat transfer from the wall 104 of the combustion chamber to the sensing element 12 is retarded and the direct application of forces is prevented.

From the foregoing description those skilled in the art will appreciate that numerous modifications may be made of my invention without departing from the spirit thereof. Therefore, I do not intend to limit the breadth of my invention to the single embodiment illustrated and described but rather it is my intention that the scope of this invention be determined by the appended claims and their equivalents.

What I claim as new and desire to secure by Letters Patent of the United States is:

1. In a pressure gauge including a casing adapted to be inserted into an opening in a wall of a chamber and having a pressure sensing device in the casing exposed to the pressure in the chamber; a cooling system for the gauge comprising means forming a pair of passages in the casing for directing a cooling medium to and from the pressure sensing device, means forming an annular space in the casing about the periphery of the sensing device and isolating the outer portion of the casing adapted to engage the walls of the combustion chamber from the inner portion of the casing, a thin flexible member closing the space, and means forming a second pair of passages in the casing independent from the first recited pair and free of communication with said first recited pair connected to the space for directing a cooling medium through the space.

2. In a pressure gauge having a pressure sensing diaphragm supported by an inner case at its lower end, said diaphragm adapted to be exposed to the pressure source directly; an outer case separated from the inner case by an annular space and being joined together with the inner case at the upper end of the outer case, a flexible annular diaphragm joining the lower ends of the two cases to close the open end of the annular space between the two cases and form a sealed closed chamber with the space, said annular diaphragm failing to provide any essential elastic restraining force against the relative deflection of the two cases, means supplying a suitable cooling medium for flushing the annular space at a predetermined flow rate, and means providing a cooling action for the pressure sensing diaphragm independent of and free of communication with the first named means.

3. In a pressure gauge having a cylindrical wall defining a casing, a pair of spaced apart diaphragms within one end of the casing, and means for directing a cooling medium between the diaphragms; a heat barrier between the inner and outer surfaces of the casing comprising means forming a recess extending around the casing in the end surface of the cylindrical wall adjacent the diaphragms, means forming an annular space in the end of the casing as a physical continuation of the recess in an axial direction, the recess and annular space dividing that end of the wall into separate inner and outer portions, a flexible member closing the recess, and means forming inlet and outlet passages in the casing separate from and free of communication with the means directing a cooling medium between the diaphragms for directing a cooling medium through the recess and annular space.

4. In a pressure gauge having a cylindrical casing open at one end, and a pressure sensing device mounted in the casing at the open end and including a diaphragm extending across the open end and secured at its periphery to the inner surface of the casing; a cooling system for the casing comprising means forming an annular space extending about the open end of the casing and separating the inner and outer surfaces of the casing, a diaphragm bridging the inner and outer surfaces of that end of the casing and closing the space to form a closed annular passage in that end of the casing, said annular diaphragm being substantially incapable of transferring forces from the outer to the inner surface of the casing, means forming an inlet and an outlet passage in the casing for directing a cooling medium into and out of the annular passage, and means providing a cooling action for the diaphragm of the pressure sensing device independent of and free of communication with the annular passage and the outlet passage.

5. In a pressure gauge having a casing open at one end, and a pressure sensing device mounted on the inner surface of the casing at the open end; a cooling system for the casing comprising means forming a space extending about the open end of the casing and separating the inner and outer surfaces of that end of the casing, a diaphragm bridging the inner and outer surfaces of that end of the casing and closing the space to form a closed cooling passage in that end of the casing, said diaphragm being substantially incapable of transferring forces from the outer to the inner surface of the casing, means forming an inlet and an outlet passage in the casing for directing a cooling medium into and out of the cooling passage, and means providing a cooling action for the pressure sensing device independent of and free of communication with the cooling passage and the outlet passage.

6. In a pressure gauge having walls defining a casing open at its bottom, the lower portion of the casing being adapted to be inserted into an opening in a wall of a chamber where the pressure is to be measured; means forming an annular space in the casing and dividing the lower portion of the casing into inner and outer substantially unconnected portions spaced radially from one another, a thin flexible cover extending over and closing the bottom of the space, said cover being substntially incapable of transferring forces from the outer to the inner portion of the casing, directing means formed in the walls of the casing and extending downwardly from the upper portion of the casing for directing a cooling medium through the annular space, means for mounting a pressure sensing device in the inner portion of the casing, and additional means provided in the casing for directing a cooling medium to and from a pressure sensing device mounted in the inner portion of the casing, said additional means being independent of and free of communication with both the annular passage and said directing means.

References Cited in the file of this patent

UNITED STATES PATENTS

| 2,439,047 | Grinstead et al. | Apr. 6, 1948 |
| 2,627,749 | Li | Feb. 10, 1953 |
| 2,637,210 | Hathaway | May 5, 1953 |
| 2,741,128 | Gadd et al. | Apr. 10, 1956 |

FOREIGN PATENTS

| 704,685 | Great Britain | Feb. 24, 1954 |